(12) United States Patent
Gimbel (10) Patent No.: US 6,364,686 B2
(45) Date of Patent: Apr. 2, 2002

(54) ELECTRICAL AND/OR OPTICAL CONNECTOR WITH A LATCHING ARM

(75) Inventor: Markus Gimbel, Wettstetten (DE)

(73) Assignee: Tyco Electronics AMP GmbH (DE)

( * ) Notice: Subject to any disclaimer, the term of this patent is extended or adjusted under 35 U.S.C. 154(b) by 0 days.

(21) Appl. No.: 09/726,094

(22) Filed: Nov. 29, 2000

(30) Foreign Application Priority Data

Nov. 30, 1999 (EP) .............................. 99123724

(51) Int. Cl.[7] ................................. H01R 13/627
(52) U.S. Cl. ......................................... 439/357
(58) Field of Search ................. 439/359, 358, 439/352, 353, 354, 355, 350

(56) References Cited

U.S. PATENT DOCUMENTS

| 3,409,858 A | * | 11/1968 | Krehbiel | 439/353 |
| 4,010,998 A | * | 3/1977 | Tolnar, Jr. et al. | 439/357 |
| 5,030,127 A | * | 7/1991 | Blasko et al. | 439/353 |
| 5,137,466 A | * | 8/1992 | Endo et al. | 439/357 |
| 5,782,438 A | * | 7/1998 | Hubben et al. | 248/27.3 |
| 5,876,232 A | * | 3/1999 | Matsushita et al. | 439/357 |

* cited by examiner

*Primary Examiner*—Renee Luebke
*Assistant Examiner*—Briggitte R. Hammond (57) ABSTRACT

An electrical and/or optical plug connector having a housing, intended for receiving electrical or optical contacts, and with at least one latching arm, the latching arm being longitudinally divided into two arm portions which can move independently of one another, and in that each of the arm portions has a latching projection which are of different construction, with one arm portion serving to perform secure latching and the other serving to reduce the amount of play.

13 Claims, 7 Drawing Sheets

ELECTRICAL AND/OR OPTICAL CONNECTOR WITH A LATCHING ARM

BACKGROUND OF THE INVENTION

The invention relates to an electrical and/or optical plug connector having a housing, intended for receiving electrical or optical contacts, with at least one latching arm.

DESCRIPTION OF THE PRIOR ART

U.S. Pat. No. 3,409,858 discloses an electrical connector having a housing and a latching arm provided thereon. The latching arm has a latching projection and latches into a latching opening of a housing of a complementary electrical plug connector. On that side of the housing opposite the latching arm, the electrical plug connector furthermore has a bevelled elevated portion which cooperates with a corresponding opening in the complementary connector and is adapted to minimise the amount of play which exists between the two complementary connectors, even when they are latched together. However, this arrangement does not have the two plug connectors pushed against one another by the action of a force.

U.S. Pat. No. 4,010,998 discloses a further electrical connector having a housing, intended for receiving electrical contacts, and a latching arm. In this case, the latching arm has an elongate opening to receive the corresponding latching nose therein. The two arm portions are, however, still rigidly connected to one another at their free end.

SUMMARY OF THE INVENTION

The object of this invention is to provide an electrical and/or optical connector having a housing, intended for receiving electrical or optical contacts, and a latching arm through which secure latching and the minimisation of the amount of play can be achieved.

The object is achieved by a connector having a housing which is constructed to receive electrical and/or optical contacts is provided. The housing has at least one latching arm. The latching arm is longitudinally divided, from its free end, into arm portions which can move independently of one another and each of the arm portions bears a different latching projection.

Advantageous further developments are specified in the dependent claims.

Because the two latching projections are of different construction, it is possible to fulfil different functions using the two arm portions. One of the two latching projections can for example be constructed such that it can be used to perform secure latching. Latching of this kind may, however, still leave a considerable amount of play between the two complementary plug connectors. To compensate for this play, the second movable arm portion may be used. For this purpose, the corresponding latching projection has for example an oblique plane which co-operates with the latching opening of the complementary plug connector.

It is particularly advantageous that the two arm portions may be unlatched at the same time. This is achieved by one of the arm portions having at its free end a releasing button by means of which the second arm portion is also actuated for release.

It is particularly advantageous that the two arm portions may be manufactured simply with respect to the releasing button. This is achieved in that the releasing button is constructed as a transverse bar at the free end of the one arm portion and projects beyond the free end of the second arm.

It is furthermore particularly advantageous that it is possible to reduce the amount of play between the complementary plug connectors. This is achieved by an oblique plane or a convex portion being provided on the latching projection of the second arm portion, this oblique plane or convex portion co-operating with a wall of the latching opening of the complementary plug connector. This particular arrangement has the effect that, because of the spring action of the second arm portion, the two complementary plug connectors are held in a position in which their front faces are as close together as possible, in a manner almost free of play.

The connector according to the invention, having a longitudinally divided latching arm, may be used in electrical and in optical or hybrid plug connectors. It is not restricted to being located on a one-piece plug connector, but may also be provided, for example, on an outside housing which receives for example further modular housings having the contact chambers.

BRIEF DESCRIPTION OF THE DRAWINGS

FIG. 8 shows a partly cut-away side view of the optical plug arrangement, in the fully plugged-in condition, in a section along the line A in accordance with FIG. 5.

DETAILED DESCRIPTION OF THE PREFERRED EMBODIMENT

Figure 1:
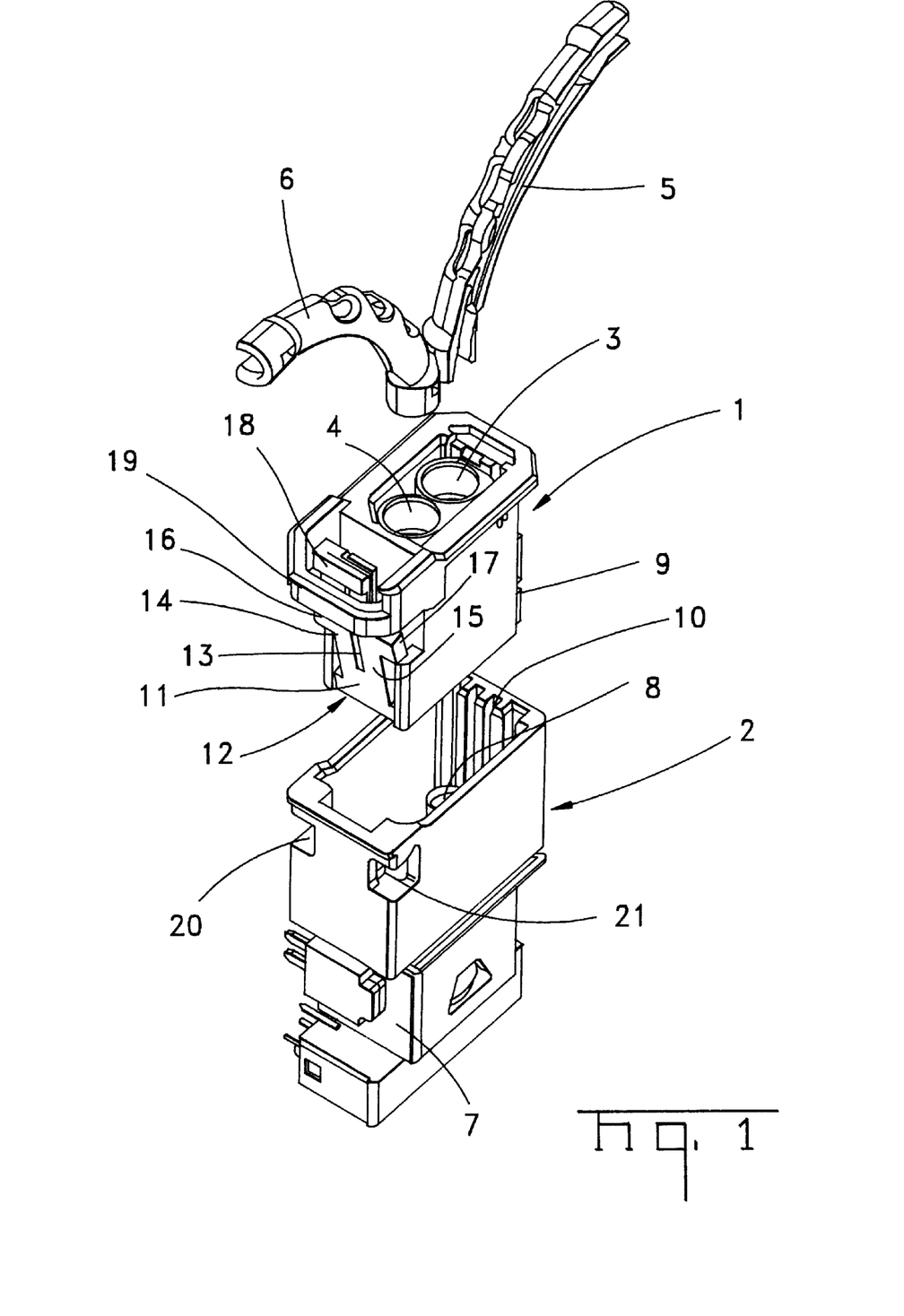
FIG. 1 shows an optical plug arrangement according to the invention, in a perspective exploded illustration.
Figure 2:
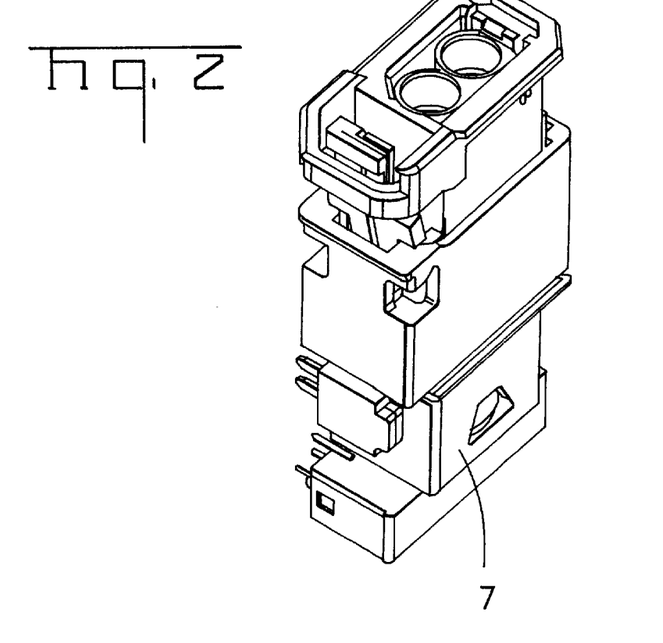
FIG. 2 shows the optical plug arrangement according to FIG. 1 in a perspective side view, in the not yet plugged-in condition.
Figure 3:
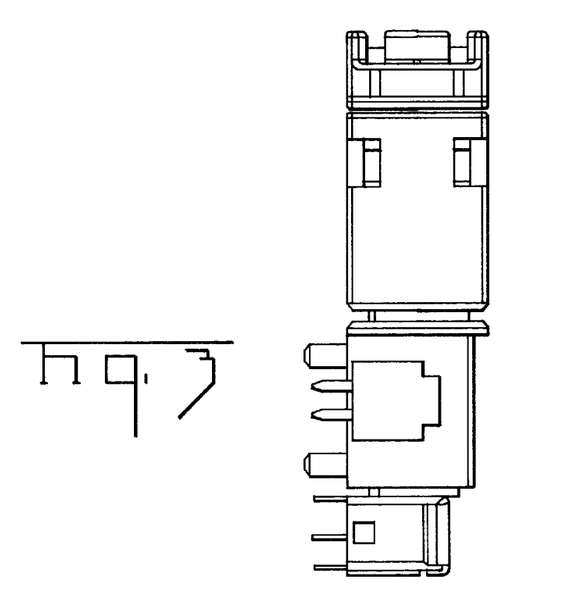
FIG. 3 shows a side view of the optical plug arrangement according to FIG. 1, in the fully plugged-in condition.

FIG. 1 shows an optical connector in an exploded illustration. The connector comprises a first housing 1 of a first plug connector and a second housing 2 of a second complementary plug connector. The first housing 1 has two receiving chambers 3 which serve to receive optical contacts. Indicated here as the optical contacts are sleeves which are mounted on the ends of optical waveguides and may be inserted into the receiving chambers 3 and 4. Also illustrated in FIG. 1 are two strain relief sleeves 5 and 6 which may be put over the optical waveguides and serve to ensure that the radius of curvature does not fall below its minimum value.

The second complementary connector having the housing 2 is connected to an opto-electrical module 7 and may be mounted on a printed circuit board. It has receiving chambers 8 for complementary optical contacts.

The second housing 2 is constructed in the form of a trough intended to receive the first housing 1. Coding ribs 9 may be provided on one side of the first housing 1, and these may be inserted into corresponding depressions 10 in the trough-shaped second housing.

On one side, the first housing 1 has a latching arm 11. The latching arm 11 is joined to the housing towards the front end face 12 of the housing 1. A slot 13 divides the latching arm 11 into two, namely into two arm portions 14 and 15. The two arm portions 14,15 each have a free end and can move independently of one another. Each of the two arm portions 14,15 has a latching projection 16,17. The latching projections 15,17 are of different constructions.

At the free end of the arm portion 14 there is furthermore provided a releasing button 18. The releasing button 18 is constructed as a transverse bar and its transverse extent is selected such that it projects beyond the free end of the second arm portion 15. The releasing button 18 is actuated by being pressed against the housing 1. Since its transverse extent extends beyond the free end of the second arm portion 15, by actuating the releasing button 18 not only the first arm portion 14 but also the second arm portion 15 is actuated.

Between the latching projections 16 and 17 and the releasing button 18 there is a U-shaped bracket 19 joined to the housing 1 which provides both a protective device during transportation and a means of preventing the latching arm 11 from being overstretched.

The second housing 2 has on one side two latching openings 20 and 21. These latching openings are constructed to receive the latching projections 16,17 of the two arm portions 14,15 of the latching arm 11 of the first housing 1. The two latching openings 20,21 are each arranged at the corner regions of a side wall. As a result of this, they can co-operate with the latching projections 16,17 arranged laterally on the arm portions 14,15.

Figure 4:
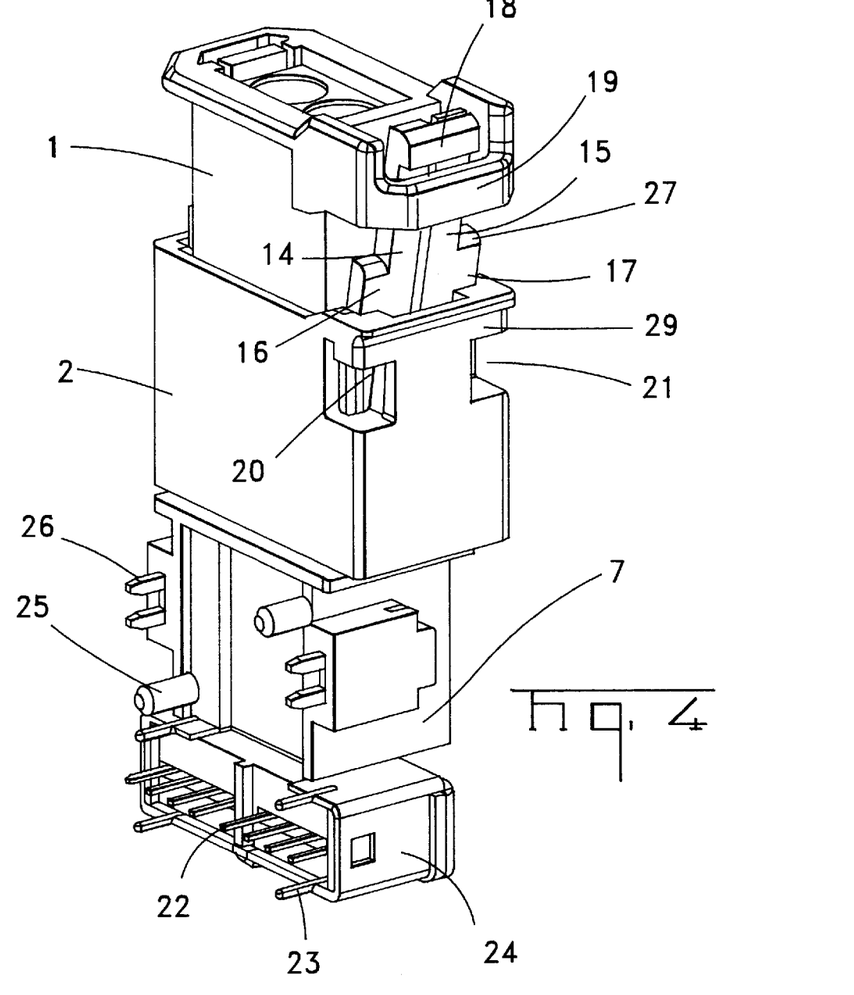
FIG. 4 shows a perspective view of the optical plug arrangement in the non-latched condition.

FIG. 4 illustrates the optical connector in the not yet fully plugged-in condition. Here too, only the first housing 1 and the second housing 2 are illustrated. The first housing 1 has not yet been correspondingly fitted with optical contacts. The two latching openings 20 and 21 are located in the trough-shaped region of the housing 2. Adjoining the trough-shaped region is the optical module 7. This has contacts 22, earthing contacts 23 of a shielding plate 24, positioning aids 25 and further contacts 26 for mounting it on a printed circuit board.

Figure 6:
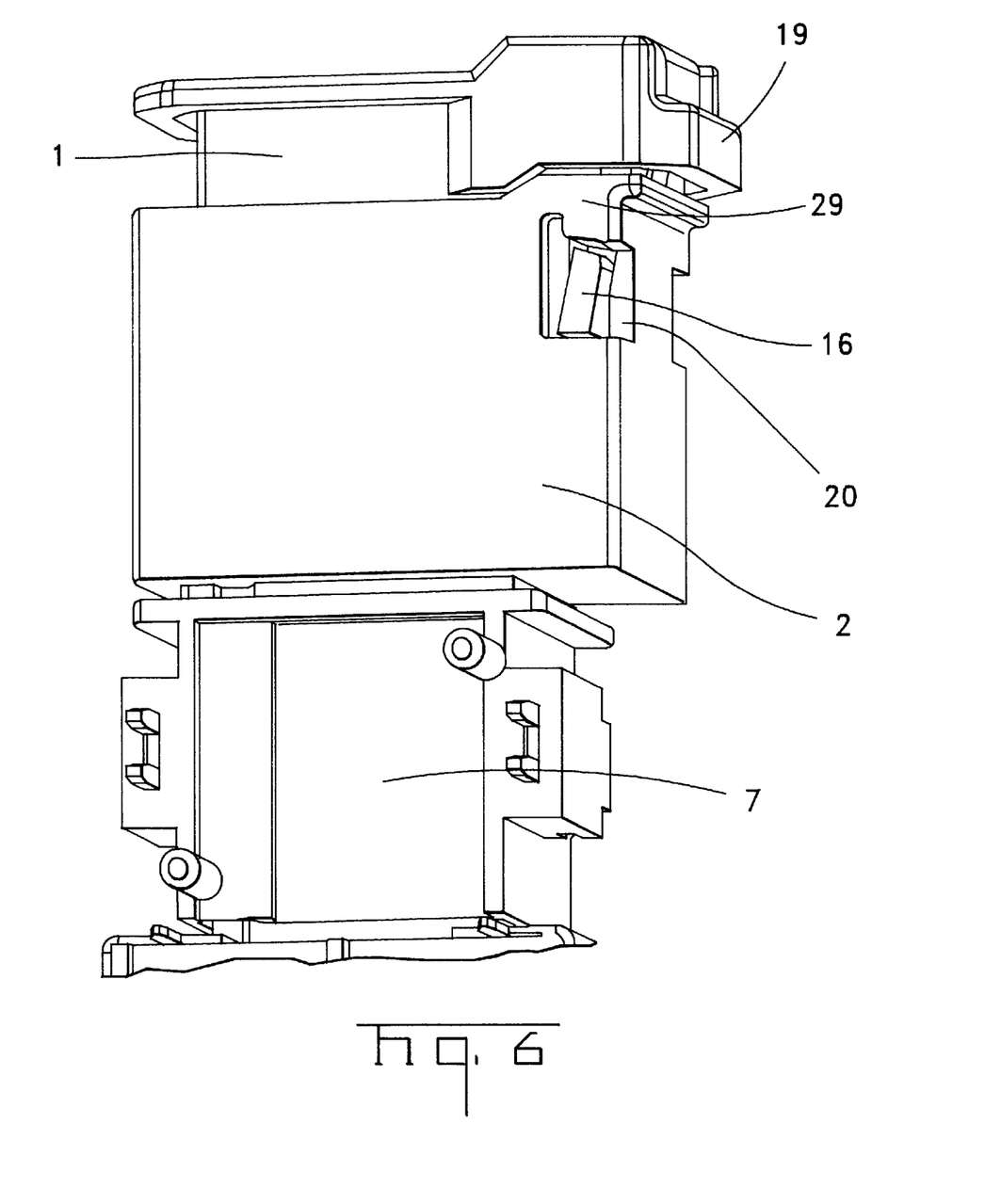
FIG. 6 shows a perspective view of the optical plug arrangement, in the fully plugged-in condition.

The different construction of the two latching projections 16 and 17 of the two arm portions 15 and 14 will now be described. The latching projection 16, which is located on the first arm portion 14 with the releasing button 18, is smaller in its longitudinal extent in the longitudinal direction of the arm portion 14 than the latching projection 17. This ensures that the arm portion 14 latches securely into the opening 20. This is illustrated in FIG. 6. The size of the opening 20 is such that the latching projection 16 has some play in the latching opening 20. However, secure latching of the two plug housings 1 and 2 with a relatively large amount of play is ensured if the latching projection 16 is latched into the latching opening 20.

The larger latching projection 17 has, at that end thereof which is on the cable side, a curvature or convex portion 27. Moreover, the latching opening 21 has a wall 28 which is inclined with respect to the direction S of insertion, and this wall 28 co-operates with the curvature 27 of the second latching projection 17 of the second arm portion 15. If the first latching projection 16 is already latched into the latching opening 20, the second latching arm 15 having the latching projection 17 serves to reduce the amount of play between the two housings 1 and 2. This is achieved by the fact that the latching projection 17, having the convex portion 27 at that end which is on the cable side, co-operates with the oblique plane 28 of the latching opening 21. Because of the spring forces of the latching arm 15, which brings about the action of a force in the direction of mating because of the corresponding oblique surfaces, the amount of play is minimised.

Figure 7:
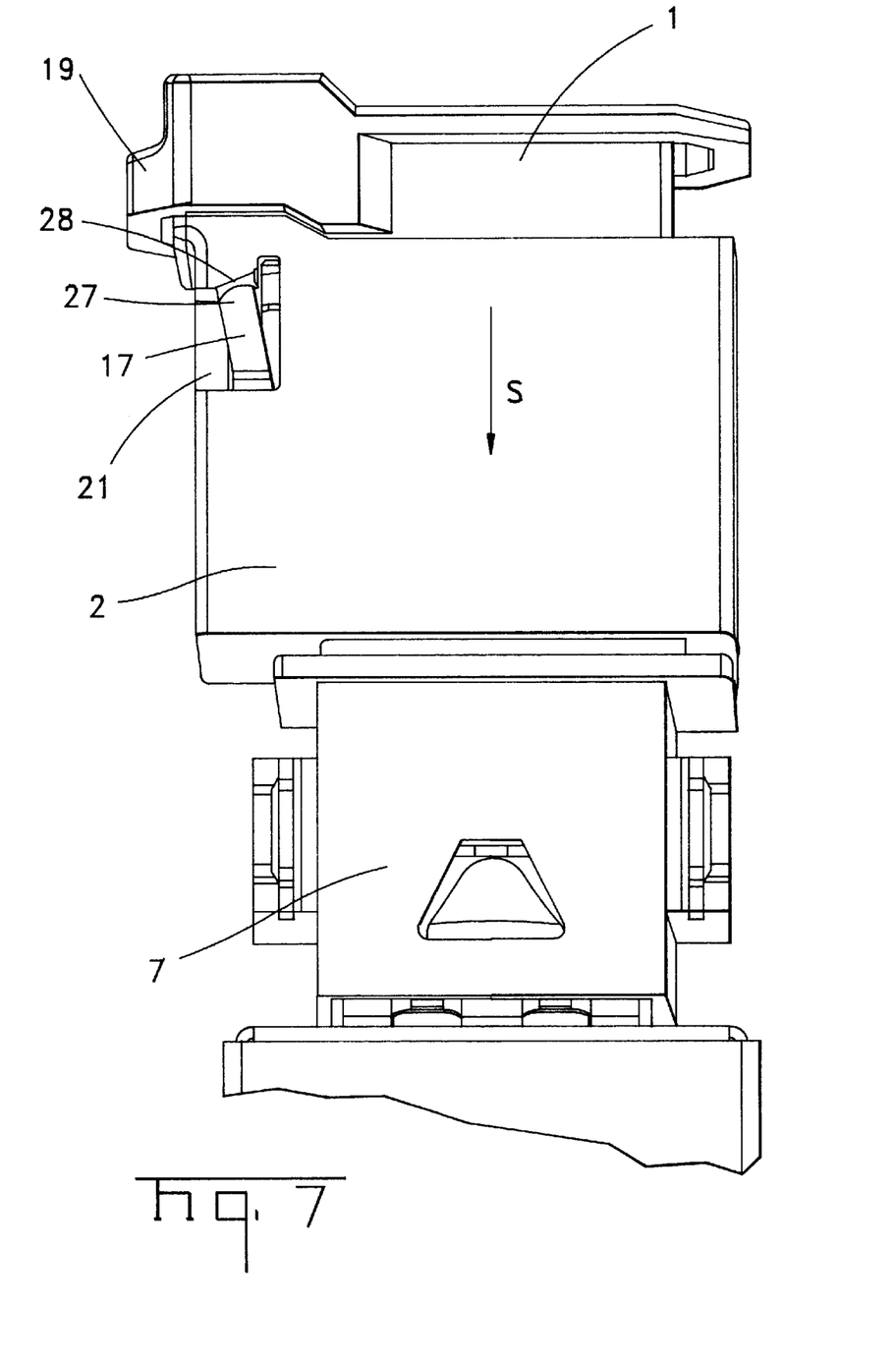
FIG. 7 shows a further perspective side view of the optical plug arrangement, in the fully plugged-in condition.

In FIGS. 6 and 7, in one case a side view is illustrated with the latched first arm portion 14 and in the other a side view is illustrated with the latched arm portion 15. As a result of the divided latching arm 11, it is possible to latch the two arm portions independently. The two arm portions moreover serve as an energy store which enables mating to be performed securely and prevents partial mating in. This is made possible by the particular construction of the collar 29 of the second housing 2. It is particularly advantageous if the latching of the two arm portions 15,14 can be unlatched together by actuating the releasing button 18, although the two arms are latched independently of one another.

Figure 9:
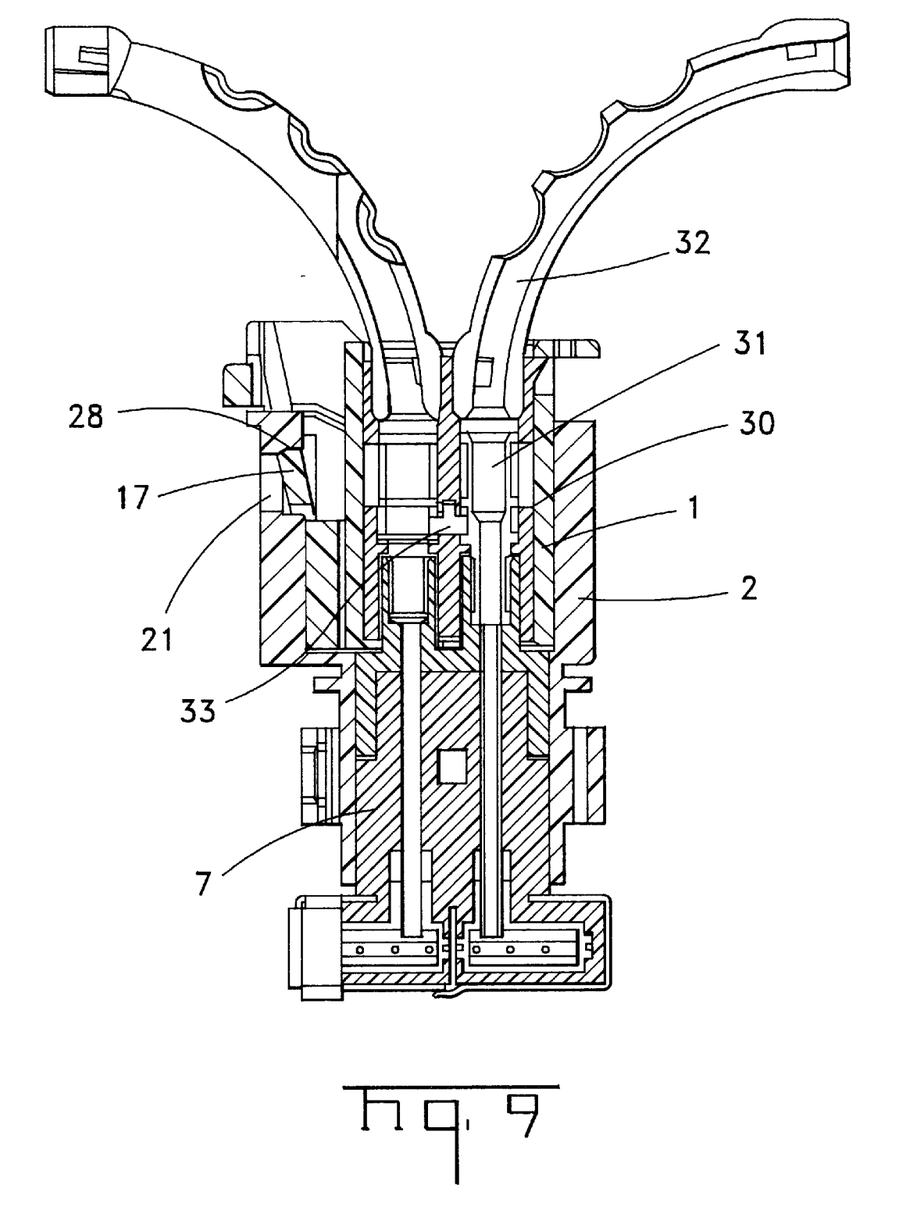
FIG. 9 shows a cross-section through the fully plugged-in optical plug arrangement along the line B in accordance with FIG. 5.

In FIGS. 8 and 9, in each case a fully latched connector is shown in cross-section, the cross-section in one case passing through the first latching projection 16 of the first arm portion 14 and in the other through the second latching projection 17 of the second arm portion 15. The illustration, as shown in FIGS. 8 and 9, also has corresponding optical contacts and optical waveguides.

Figure 5:
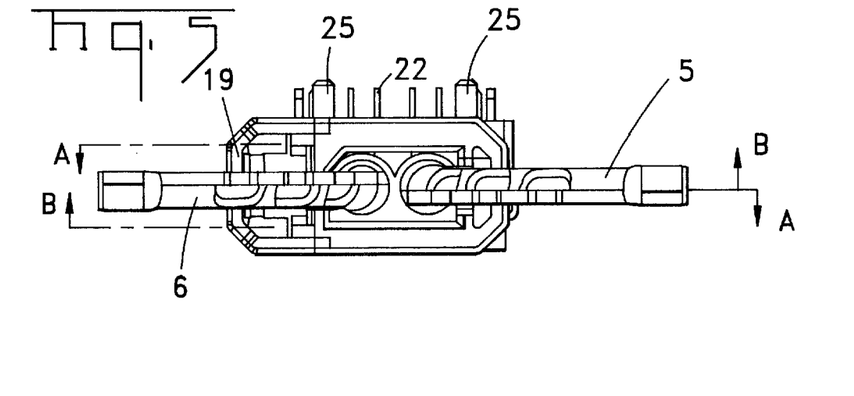
FIG. 5 shows a plan view of that end of the optical plug arrangement which is on the cable side.

FIG. 8 shows a partial section through the fully mated connector by a section passing through the latching projection 16, as illustrated in FIG. 5 by line section A—A. The latching projection 16 latches into the latching opening 20. Moreover, there is in the first housing 1 a chamber housing 30 into which the optical contacts 31 may in turn be inserted in the form of sleeves having the optical leads 32.

In FIG. 8 it is clearly visible that the latching projection 16 has some play within the opening 20. In contrast to this, the latching projection 17 co-operates with the oblique wall 28 of the latching opening 21. The first connector comprises the first housing 1, which is constructed as an outside housing, and the chamber housing 30 with the optical contacts 31, which are held in the chamber housing 30 by a contact securing device 33 and into which the optical fibres are inserted.

I claim:

1. A connector comprising a housing, intended for receiving electrical or optical contacts comprising at least one latching arm, the latching arm having a longitudinally extending slot which longitudinally divides the latching arm into a first arm portion and a second arm portion that can move independently of the first arm portion, the first arm portion has a first latching projection and a second arm portion has a second latching projection, the first latching projection having of different cross-section configuration than the second latching projection, the first and second latching projections cooperate with respective first and second openings of a mating connector when the connector and mating connector are moved to a mated position.

2. The connector according to claim 1, wherein the first latching projection of the first arm portion is offset with respect to the second latching projection of the second arm portion.

3. The connector according to claim 1, wherein the first latching projection on the first arm portion is constructed such that it enables secure latching to be performed.

4. The connector according to claim 1, wherein the second latching projection on the second arm portion has an oblique plane such that it is possible to reduce play in the mated condition.

5. The connector according to claim 1, wherein the first arm portion has at its free end a releasing button which when activated leads also to the release of the second arm portion, and in that the first latching projection on the first arm portion is constructed such that it enables secure latching to be performed.

6. The connector according to claim 1, wherein the housing has contact chambers into which the contacts are received.

7. The connector according to claim 1 and a second complementary connector having a housing, intended for receiving a complementary electrical or optical contact, and with at least one latching opening for latching the latching projections.

8. The connector according to claim 1, wherein the first and second latching arms extend from a side of the housing proximate a front end thereof.

9. The connector according to claim 1, wherein the first arm portion has at its free end a releasing button which when activated leads also to the release of the second arm portion.

10. The connector according to claim 9, wherein the releasing button is constructed as a transverse bar and when actuated acts on the free end of the second arm portion.

11. The connector according to claim 1, wherein the first latching projection is smaller in its longitudinal extent in the longitudinal direction of the first portion than the second latching projection.

12. The connector according to claim 11, wherein the first latching projection is constructed so that it is received easily into the first opening of the mating connector, thereby ensuring that the connector is securely mated to the mating connector.

13. The connector according to claim 12, wherein the second latching projection has an oblique plane which cooperates with a mating wall of the second opening of the mating connector to reduce the amount of movement between the connector and the mating connector when they are in the mated position.

* * * * *